(12) United States Patent
Kokichi

(10) Patent No.: US 8,849,106 B1
(45) Date of Patent: Sep. 30, 2014

(54) SHAKE CORRECTION DEVICE

(71) Applicant: Jiangxi Leiyuan Permanent Magnetic Materials Co., Ltd., Ganzhou (CN)

(72) Inventor: Terajima Kokichi, Tokyo (JP)

(73) Assignee: Jiangxi Leiyuan Permanent Magnetic Materials Co., Ltd., Ganzhou, Jiangxi Province (CN)

( * ) Notice: Subject to any disclaimer, the term of this patent is extended or adjusted under 35 U.S.C. 154(b) by 0 days.

(21) Appl. No.: 14/278,083

(22) Filed: May 15, 2014

(30) Foreign Application Priority Data

Dec. 16, 2013 (JP) .................. 2013-259452

(51) Int. Cl.
*G03B 5/00* (2006.01)
*H04N 5/232* (2006.01)

(52) U.S. Cl.
CPC ................ *H04N 5/2328* (2013.01); *G03B 5/00* (2013.01)
USPC .......................................................... 396/55

(58) Field of Classification Search
CPC ....................................... G03B 5/00
USPC .................................................... 396/55, 114
See application file for complete search history.

(56) References Cited

U.S. PATENT DOCUMENTS

| | | | |
|---|---|---|---|
| 6,374,049 B1 * | 4/2002 | Fujinaga | 396/55 |
| 8,238,736 B2 * | 8/2012 | Tsuruta et al. | 396/55 |
| 2013/0089311 A1 * | 4/2013 | Jung et al. | 396/55 |

* cited by examiner

*Primary Examiner* — Clayton E Laballe
*Assistant Examiner* — Dennis Hancock
(74) *Attorney, Agent, or Firm* — Rankin, Hill & Clark LLP

(57) ABSTRACT

The present invention provides a shake correction device which can not generate the hysteresis phenomenon and can suppress unnecessary resonance and improve endurance with respect to drop impact. In this shake correction device, the eddy current induction plate 16a of +Z side is opposite to and has a gap with the surface (14a) of the +Z side of the permanent magnet (14) which is arranged to wind around the optical axis at an interval of 90 degree in the Z direction, the eddy current induction plate 16b of radial direction is opposite to and has a space with the surface (14b) of the outside in the radial direction, and the eddy current induction plate 16c of the periphery direction is opposite to and has a gap with the surface (14c) in the periphery direction.

4 Claims, 6 Drawing Sheets

(a)

(b)

SHAKE CORRECTION DEVICE

TECHNICAL FIELD

The present invention relates to a shake correction device for correcting the shake generated from a camera used for a mobile phone and the like.

BACKGROUND

If a shake is generated from a lens held by a lens driving device for automatic focus, and the shake correction device of the camera swings the lens or the lens driving device for automatic focus in a direction that is perpendicular to an optical axis direction of the lens to restrain an image formed on the image sensor from shaking or shifting. For example, configurations of shake correction device described in patent document 1 include: a plurality of suspension lines, extending along the optical axis direction; a lens driving device for automatic focus, suspended and supported by the suspension lines so as to swing in the direction perpendicular to the optical axis direction; and an electromagnetic drive unit, having a coil for swinging and a permanent magnet. The shake correction device can restrain the fuzzy of the image by making the lens driving device for automatic focus swing with the lens simultaneously.

FIG. 6 shows a view of a shake correction device 30 of the prior art. FIG. 6(a) is a perspective view of the shake correction device 30, FIG. 6(b) is a perspective view of an electromagnetic drive portion, FIG. 6(c) is an enlarged perspective view of the suspension and support portion. Here, the optical axis direction of the lens which is not shown is set as Z (Z-axis) direction, and the two directions perpendicular to the Z axis are set as X (X-axis) direction and Y (Y-axis) direction.

As shown in FIG. 6, the shake correction device 30 includes: a board like base board 31 having an opening toward the Z-direction in a central portion; four suspension lines 32 extending along the Z direction; four permanent magnets 34 is board shape and held by a side surface 33b of a box shaped magnet holder 33 at the +Z side of the base board 31, and of which magnet pole surfaces are arranged to face the X direction and the Y direction and are disposed around an axis parallel to the Z axis at an interval of 90 degree; the coils 35x for swinging of the X side and the coils 35y for swinging of the Y side which are wound around the Z direction, arranged to be opposite to and have a gap with a surface of the permanent magnets 34 on the −Z side and mounted on the +Z side of the base board 31. Wherein on an inner periphery side of the permanent magnet 34, coil 40 for automatic focus is wound around an outer peripheral side of a lens holder 38, a front spring member 37A coupled to an end surface 33a on the +Z side of the magnet holder 33. The lens driving device for automatic focus is used to generate Lorentz force to shift the lens holder 38 in the Z axis direction. And a shield cover 39 having a circular opening in a center portion is mounted on the outside of the all parts.

As shown in the FIG. 6 (c), one end of each of the four suspension lines 32 is coupled to four corners of the base board 31 respectively. The other end of each of suspension lines 32 is coupled to a line connection portion 37d, the line connection portion 37d forms on an outside holding portion 37b of the front spring member 37A. Thus, the magnet holder 33 can swing along X direction and Y direction and can be supported by the suspension lines 32.

As shown in the FIG. 6 (b), coils 35x for swinging of X side are arranged on the −X side and +X side of the base board 31, coils 35y for swinging of Y side are arranged on the −Y side and +Y side of the base board 31. The lens driving device for automatic focus is swung towards the X direction after the coils 35x for swinging of X side is energized. Moreover, the lens driving device for automatic focus is swung towards the Y direction after the coils 35x for swinging of Y side is energized.

The front spring member 37A and an inside holding portion 37a of a rear spring member which is not shown in the drawings are coupled to the lens holder 38. The front spring member 37A and an arm portion 37c of the rear spring member function as a spring and suspend and support the lens holder 38 so as to move lens holder 38 towards the Z direction. Moreover, the lens holder 38 is swung by the coils 40 for automatic focus, the lens holder 38 suspended and supported by the front spring member 37A and rear spring member function as a lens driving device for automatic focus. The lens holder 38 is shifted towards the Z direction after the coils 40 automatic focus 40 is energized.

Moreover, the shield cover 39 is formed by a strong magnetic conductor or a non-magnetic conductor. The shield cover 39 is a box body with a circular opening portion formed on the surface on the +Z side, and surrounds the +Z side and the periphery side of the Z axis of the shake correction device 30. And the shield cover 39 can shield electromagnetic waves leaked from the outside or emitted from an image sensor.

Further, as shown in FIG. 6 (c), a damping material 41 formed a silicone gel and the like is clamped between the base board 31 and the magnet holder 33. The damping material 41 can suppress unnecessary resonance generated by the shake correction device 30 and improve endurance ability of the shake correction device 30 with respect to drop impact.

BACKGROUND DOCUMENT

Patent Document

[Patent document 1] Japan Patent Publication No. 2013-44924

SUMMARY

However, since the recovery nature of shape of the damping material is poor, so when the damping material is deformed during the swinging of the magnet holder 33 along the X direction or the Y direction, the damping material 41 needs certain time to return to its original shape. Thus, the lens shifts in the forward and backward paths with respective to the center of the image sensor when the lens is swung. Specifically, i.e. as shown in FIG. 7, When a current +ia flows through the coils 35x for swinging of X side, then a current −ib flows through the coils 35x, and again a current +ia flows through the coils 35x, such that the magnet holder 33 is swung forward and backward along the X direction, even if the currents +ia flow through the coils 35x for swinging of X side are of the same value, a difference $\Delta Xa$ will be produced by the amount of the shake of the X direction, which leads to a hysteresis phenomenon. Therefore, the center position of the photographed object imaged on the image sensor (not shown) will varies with the shake, thereby, images that the photographer does not want to shoot may be captured.

The purpose of the present invention is to provide a shake correction device which doesn't generate the hysteresis phenomenon and can suppress unnecessary resonance and improve endurance with respect to drop impact.

A shake correction device of the present invention includes: a plurality of rectangle board-shaped permanent magnets, when the direction toward the photographed object is set as the positive direction of an optical axis direction, a surface of each of the permanent magnets faces the lens and the permanent magnets are disposed around the optical axis at an interval of 90 degree, and the permanent magnets and the lens are swung along a direction perpendicular to the optical axis direction, wherein the shake correction device further includes: a brake member, formed by a non-magnetic conductor, and at least one eddy current induction plate arranged on the brake member, wherein, the at least one eddy current induction plate is arranged to be opposite to and has a gap with a surface on an outer periphery side of the permanent magnet, a surface on the positive direction of the optical axis, and a surface adjacent to the surface on the outer periphery side and the surface on the positive direction of the optical axis, and the at least one eddy current induction plate generates eddy currents in response to a magnetic field caused by the shift of the permanent magnets.

Thus, the shake correction device of the present invention may mitigate vibration or impact of the shake correction device without using the damping material, thereby preventing the generation of the hysteresis phenomenon. Furthermore, the shake correction device can also suppress unnecessary resonance and improve endurance with respect to the impact from the outside.

As another constitution of the shake correction device of the present invention includes: a plurality of rectangle board-shaped permanent magnets, when the direction toward the photographed object is set as the positive direction of an optical axis, a surface of each of the permanent magnets faces the lens and the permanent magnets are disposed around the optical axis at an interval of 90 degree, and the permanent magnets and the lens are swung along a direction perpendicular to the optical axis, wherein the shake correction device further includes: a brake member, formed by a non-magnetic conductor, at least one eddy current induction plate and at least one electromagnetic shield board arranged on the brake member, wherein, the at least one eddy current induction plate is arranged to be opposite to and has a gap with a surface on an outer periphery side of the permanent magnet and a surface on the positive direction of the optical axis, and eddy currents are generated by the at least one eddy current induction plate in response to a magnetic field caused by the shift of the permanent magnets; the at least one electromagnetic shield board has a rectangle board-shaped top portion and a side portion, and covers the positive direction of the optical axis and the outer periphery side of the permanent magnet, wherein, an opening is formed in a center portion of a surface facing to the optical axis direction of the top portion and is arranged on the positive direction of the optical axis direction of the permanent magnets, the side portion extends towards the negative direction of the optical axis direction from an edge portion of the top portion and is arranged beside the side surfaces of the permanent magnets.

Thus, the shake correction device of the present invention may mitigate vibration or impact, and may shield electromagnetic waves leaked from the outside or emitted from an image sensor.

As another constitution of the shake correction device of the present invention is as follow: the brake member includes a core portion which is arranged more closer to the negative direction of the optical axis than the permanent magnet and is arranged to be opposite to and has a gap with the surface on the negative direction of the optical axis direction of the permanent magnet, so as to apply a braking force to the permanent magnet by the eddy current induction plate on the negative direction of the optical axis, so the unnecessary resonance generated by the shake correction device is suppressed and the endurance with respect to drop impact from the outside has been improved.

Further, the summary of the invention does not include all necessary features of the present invention, a sub-combinations of a group of these features can also become a part of the present invention.

Figure 1:
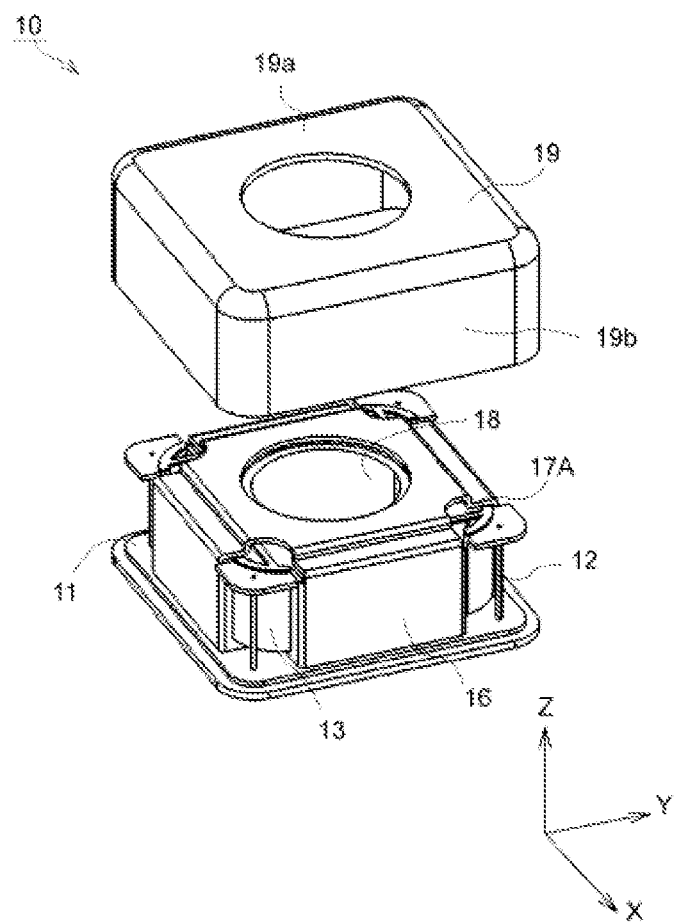
FIG. 1 shows a perspective view of a shake correction device in accordance with the embodiment one of the present invention.

SYMBOLIC DESCRIPTION 10, 10S, 30 shake correction device
11, 31 base board
12, 32 suspension line
13, 33 magnet holder
13a bottom face
13b column portion
13c flange portion
14, 34 permanent magnet
14a, 14c, 33b side surface
14b, 14d surface
14k gap
15x, 35x coil for swinging of X side
15y, 35y coil for swinging of Y side
16, 16S brake member
16a, 16b, 16c, 16e eddy current induction plate
16d top portion
16f side portion
17a, 37a inside holding portion
17A, 37A front spring member
17b, 37b outside holding portion
17B rear spring member
17c, 37c arm portion
18, 38 lens holder
19, 39 shield cover
19a top board
19b outer periphery side
20, 40 coil for automatic focus
21 lens driving device for automatic focus
33a end surface
37d line connection portion
41 damping material
X, Y, Z direction
+ia, −ib current
ΔXa difference

DETAILED DESCRIPTION OF THE PREFERRED EMBODIMENTS

Hereinafter, the present invention is described in detail through embodiments, but the following embodiments are not to limit scopes of claims of the present invention, further, all combinations of features described in the embodiments are not necessarily essential for solving methods of the present invention.

Figure 2:
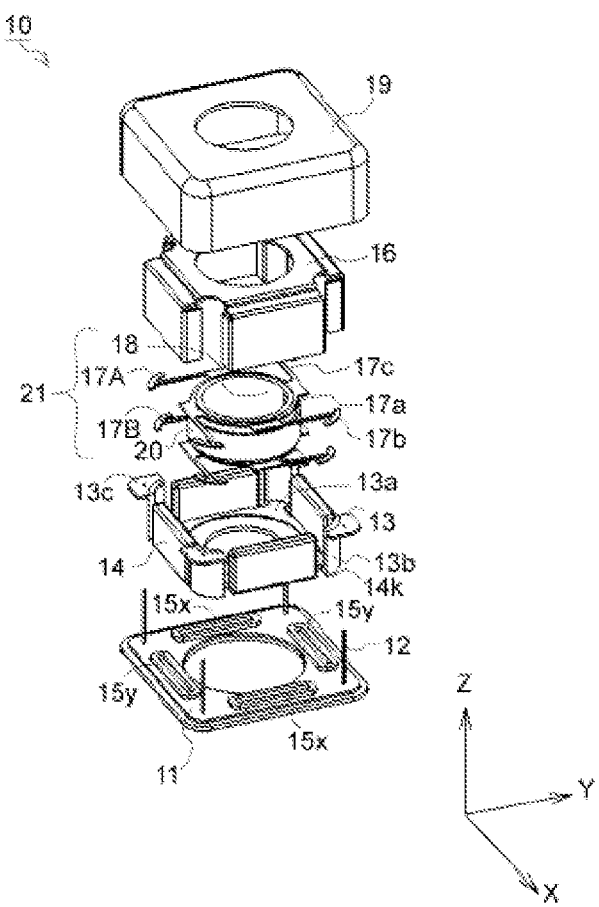
FIG. 2 shows an exploded perspective view of the shake correction device in accordance with the embodiment one of the present invention.
Figure 3:
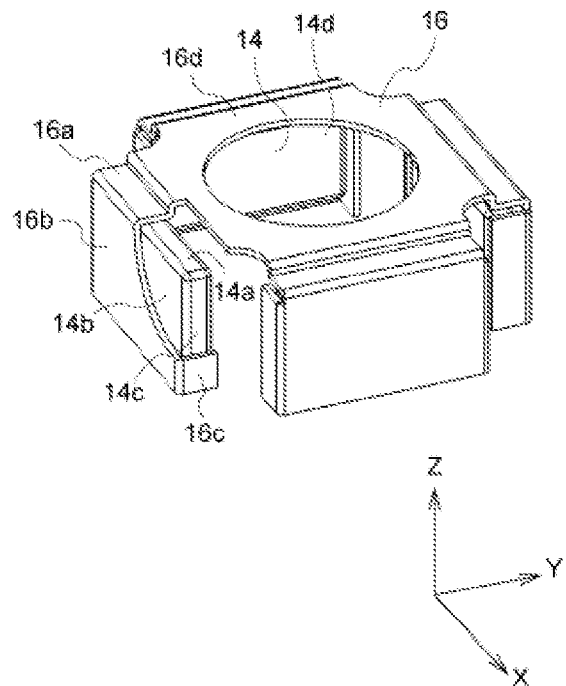
FIG. 3 shows a perspective view of main parts of the shake correction device in accordance with the embodiment one of the present invention.

The embodiment one:

FIG. 1 shows a perspective view 10 of a shake correction device in accordance with the embodiment one of the present invention, FIG. 2 shows an exploded perspective view of the shake correction device 10 in accordance with the embodiment one of the present invention, FIG. 3 shows a perspective view of main parts of a cutting portion of a brake member 16 of the shake correction device 10 in accordance with the embodiment one of the present invention. Hereinafter, the optical axis direction of the lens which is not shown is set as Z (Z-axis) direction, the direction toward the photographed object is set as the positive direction of the Z axis (+Z-axis), and the two directions perpendicular to the Z axis are set as X (X-axis) direction and Y (Y-axis) direction.

As shown in the drawings, the shake correction device 10 includes a base board 11, a suspension line 12, a magnet holder 13, a permanent magnet 14, a coil 15x for swinging of X side, a coil 15y for swinging along Y-axis, and a brake member 16, wherein the permanent magnet 14 and a lens are swung in the direction orthogonal to an optical axis. The lens driving device 21 for automatic focus is supported in an inner side of the shake correction device 10.

The base board 11 is formed to be a rectangle board-shaped, and has a circular opening facing to the Z direction in the central portion. The suspension lines 12 are four rod-shaped member extending along the Z direction. An end portion on the −Z side of the suspension lines 12 are coupled to four corners of the base board 11, an end portion on the +Z side are connected to a flange portion 13c, the flange portion 13c are arranged on the four corners of the magnet holder 13.

The magnet holder 13 includes: a rectangle board-shaped bottom face 13a that has a circular opening facing to the Z direction in the central portion; a column portion 13b which is arranged to erect along the +Z direction from the four corners of the bottom face 13a; the flange portion 13c extends radially outward from the end portion of the column portion 13b. The magnet holder 13 is arranged on the +Z side of the base board 11 in a non-contact manner by the suspension lines 12.

The coil 15x for swinging of X side is arranged on a surface on the +Z side near the edge portions of the −X side and the +X side of the base board 11. The coil 15y for swinging of Y side is arranged on a surface on the +Z side near the edge portion of the −Y side and the +Y side of the base board 11. The coils 15x, 15y for swinging are arranged more closer to the negative direction of the optical axis direction (Z axis direction) than the permanent magnet.

The permanent magnet 14 is a rectangle board-shaped, wherein four permanent magnets 14 are arranged around the optical axis at an interval of 90 degree. Each of the permanent magnet 14 is opposite to and has a gap with the coil 15x for swinging of X side and the coil 15y for swinging of Y side along the Z-axis. The permanent magnets 14 are respectively arranged on the edge portions of the four edge of the bottom face 13a of the magnet holder 13, and are arranged to have a surface 14b facing to the outside (outer periphery side) at a radial direction and a surface 14d facing to the inside (inner periphery side). Moreover, the permanent magnet 14 and the column portion 13b of the magnet holder 13 are staggered arranged around the axis which parallels with the Z axis. A gap 14k is formed between the permanent magnet 14 and the column portion 13b.

As shown in FIG. 3, the brake member 16 is a non-magnetic conductor. The brake member 16 includes: an eddy current induction plate 16a on +Z side, an eddy current induction plate 16b of radial direction (outer periphery side), an eddy current induction plate 16c of periphery direction (adjacent to the eddy current induction plate 16a of +Z side and the eddy current induction plate 16b of radial direction (outer periphery side)), a top portion 16d of rectangle board-shaped facing to the Z-axis has a circular opening in the center portion, and the four edges (outside edge portion) of the top portion 16d are coupled to the eddy current induction plate 16a on the +Z side. The eddy current induction plates 16a, 16b, and 16c generate the eddy current in response to a magnetic field generated by the shift of the permanent magnet.

The eddy current induction plate 16a of +Z side and the eddy current induction plate 16c of periphery direction are formed by pressing or formed by bending a metal plate. The eddy current induction plate 16a of +Z side and the eddy current induction plate 16c of periphery direction are mounted on the base board 11 in a manner that are adjacent and perpendicular to the eddy current induction plate 16b of radial direction.

The eddy current induction plate 16a of +Z side is opposite to and has gap with the side surface (surface) 14a of the +Z side (the positive direction of the optical axis) of the permanent magnet 14 on the Z direction. The eddy current induction plate 16b of radial direction is opposite to and has a gap with the outside (the outer periphery side) surface 14b of the permanent magnet 14 in the radial direction (X-axis direction and the Y-axis direction). The eddy current induction plate 16c of the periphery direction is opposite to the side surface (surface) 14c of the periphery direction of the permanent magnet 14 in the periphery direction (X-axis direction and the Y-axis direction), and doesn't contact with the permanent magnet 14 and the column portion 13b.

A shield cover 19 is mounted on the outside of the brake member 16. The shield cover 19 is a member of box shape and includes a top board 19 and an outer periphery side 19b which extends towards the −Z direction from the top board 19a, the top board 19 has a circular opening in the positive direction of the Z direction of the shake correction device 10; besides, the shield cover 19 is not a necessary composition for the shake correction device 10 of the present embodiment, which can be installed as required.

The lens driving device 21 for automatic focus includes: a front spring member 17A; a rear spring member 17B; a lens holder 18, an end portion on +Z side and an end portion on −Z side of the lens holder 18 are suspended and supported by the front spring member 17A and rear spring member 17B so as to be shifted along the Z direction; a coil 20 for automatic focus is energized to generate a Lorentz force to make the lens holder 38 shift along the Z direction.

The lens holder 18 with an opening along the Z direction is a member of cylinder shape, and is mounted with the coil 20 for automatic focus which is wound around the axis which parallels with the Z axis. The front spring member 17A and the rear spring member 17B includes: an inside holding portion 17a coupled to the lens holder 18; an outside holding portion 17b coupled to the flange portion 13c of the magnet holder 13; and a arm portion 17c coupled to the inside holding portion 17a and the outside holding portion 17b and functioning as a spring.

The magnet holder 13 can be supported by the suspension line 12 when swung along X direction and the Y direction. Thus, the magnet holder 13 makes the permanent magnet 14 (and further the lens driving device 21 for automatic focus) swing along the X direction when the coil 15x for swinging of X side is energized. And the magnet holder 13 makes the permanent magnet 14 (and further the lens driving device 21 for automatic focus) swing along the Y direction when the coil 15y for swinging of Y side is energized.

If a vibration or impact is applied to the above described shake correction device 10, the suspension line 12 suspended by using the permanent magnet 14 and the lens driving device 21 for automatic focus as a vibration mass will generate a bending vibration toward the X direction and the Y direction or a stretching vibration towards the Z direction. The brake member 16 (specifically for the eddy current induction plate 16a of +Z side, the eddy current induction plate 16b of radial direction and the eddy current induction plate 16c of periphery direction) fixed on the base board 11 are opposite to the permanent magnet 14. Therefore, the eddy current of which the amount corresponds to the shift (vibration) speed flows through the surfaces of the eddy current induction plate 16a of +Z side, the eddy current induction plate 16b of radial direction and the eddy current induction plate 16c of periphery direction to offset the change of the magnetic field generated due to the shift (vibration) of the permanent magnet 14.

That is, the eddy current aiming at offsetting the change of the magnetic field flows through the surface of the eddy current induction plate 16a of +Z side according to the change of the distance (the opposite distance) and the shifting of the opposite faces of the eddy current induction plate 16a of +Z side and the side surface (surface) 14a of the +Z side of the permanent magnet 14. With the energization of the eddy current, the permanent magnet 14 generates a magnetic field to suppress the change of the opposite distance and to suppress the braking force of the offset of the opposite faces.

Moreover, the eddy current aiming at offsetting the change of the magnetic field flows through the surface of the eddy current induction plate 16b of the radial direction according to the change of the distance (the opposite distance) and the shifting of the opposite faces of the eddy current induction plate 16b of radial direction and the surface 14b of the outside of the permanent magnet 14. With the energization of the eddy current, the permanent magnet 14 generates a magnetic field to suppress the change of the opposite distance and to suppress the braking force of the offset of the opposite faces.

Moreover, the eddy current aiming at offsetting the change of the magnetic field flows through the surface of the eddy current induction plate 16c of the periphery direction according to the change of the distance (the opposite distance) and the shifting of the opposite faces of the eddy current induction plate 16c of radial direction and the side surface 14c of the periphery direction of the permanent magnet 14. With the energization of the eddy current, the permanent magnet 14 generates a magnetic field to suppress the change of the opposite distance and to suppress the braking force of the offset of the opposite faces.

Thus, the permanent magnet 14 generates a magnetic field as a powerful braking force due to a rapid shift thereof, when the permanent magnet 14 is shifted slowly, the permanent magnet 14 generates a magnetic field as a slight braking force. If the permanent magnet becomes stationary with the magnetic field generated, the eddy current is no longer flows through the eddy current induction plate 16a of +Z side, the eddy current induction plate 16b of radial direction and the eddy current induction plate 16c of periphery direction, and the magnetic field as a braking force disappears.

As a result, the vibration or the impact generated by shake correction device 10 is eased, thereby preventing the generation of the hysteresis phenomenon and also suppressing unnecessary resonance generated by the shake correction device 10, which improves endurance with respect to impact from the outside. The center position of the photographed object imaging on the image sensor won't be changed.

Figure 4:
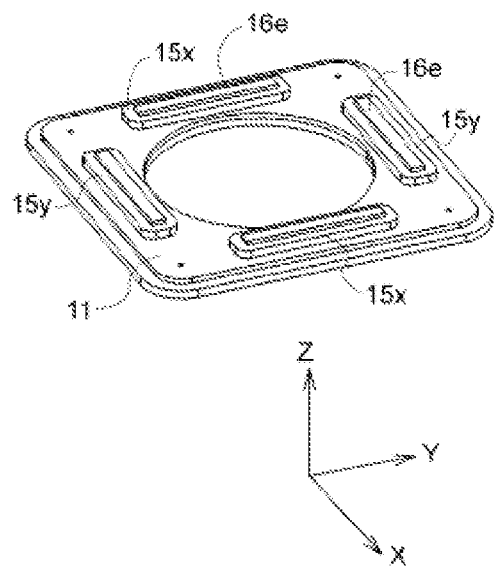
FIG. 4 shows a perspective view of main parts of improved example of the shake correction device in accordance with the embodiment one of the present invention.

FIG. 4 shows a perspective view of main parts of improved example of the shake correction device 10 in accordance with the embodiment one of the present invention. In the improved example, an back side eddy current induction plate 16e is arranged on the winding core portion (near the center of the winding) of the coil 15x for swinging of X side and coil 15y for swinging of Y side of the base board 11. The back side eddy current induction plate 16e is opposite to and has a gap with a surface in the negative direction of the optical axis direction of the permanent magnet 14. In this case, besides the eddy current induction plate 16a of +Z side, the eddy current induction plate 16b of radial direction and the eddy current induction plate 16c of periphery direction, the back side eddy current induction plate 16e can also used to apply the braking force (generating a magnetic field) to the permanent magnet 14 which has already been shifted (generate vibration). Thus, the back side eddy current induction plate 16e can suppress unnecessary resonance generated by the shake correction device 10 and improve endurance with respect to impact from the outside.

FIG. 5(a) shows a perspective view of a shake correction device 10S in accordance with the embodiment two of the present invention, FIG. 5(b) shows a perspective view of a brake member 16S mounted on the shake correction device 10S and a cutting portion of a brake member 16S in accordance with the embodiment one of the present invention. The difference between the shake correction device 10S of the embodiment two and the shake correction device 10 of the embodiment one is that the brake member 16S is installed instead of the brake member 16. The members of the embodiment two are the same with the members of the embodiment one except for the brake member 16S, so the same reference numerals and descriptions is omitted.

Figure 5:
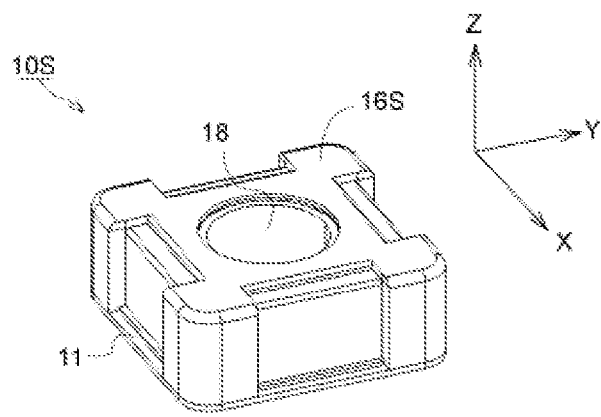
FIG. 5 shows a perspective view of the shake correction device in accordance with the embodiment two of the present invention.
Figure 5:
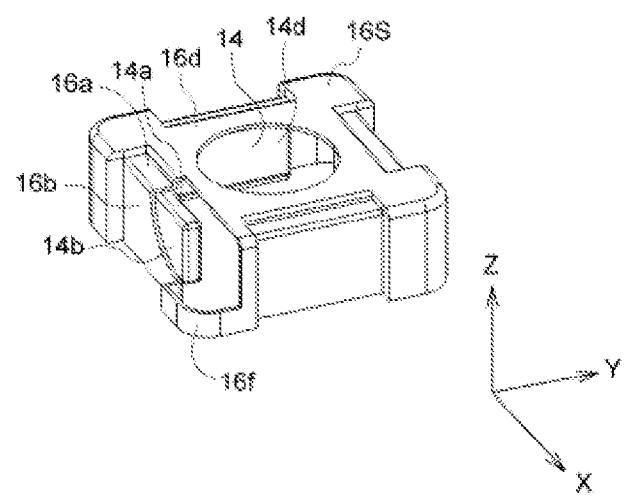
Figure 6:
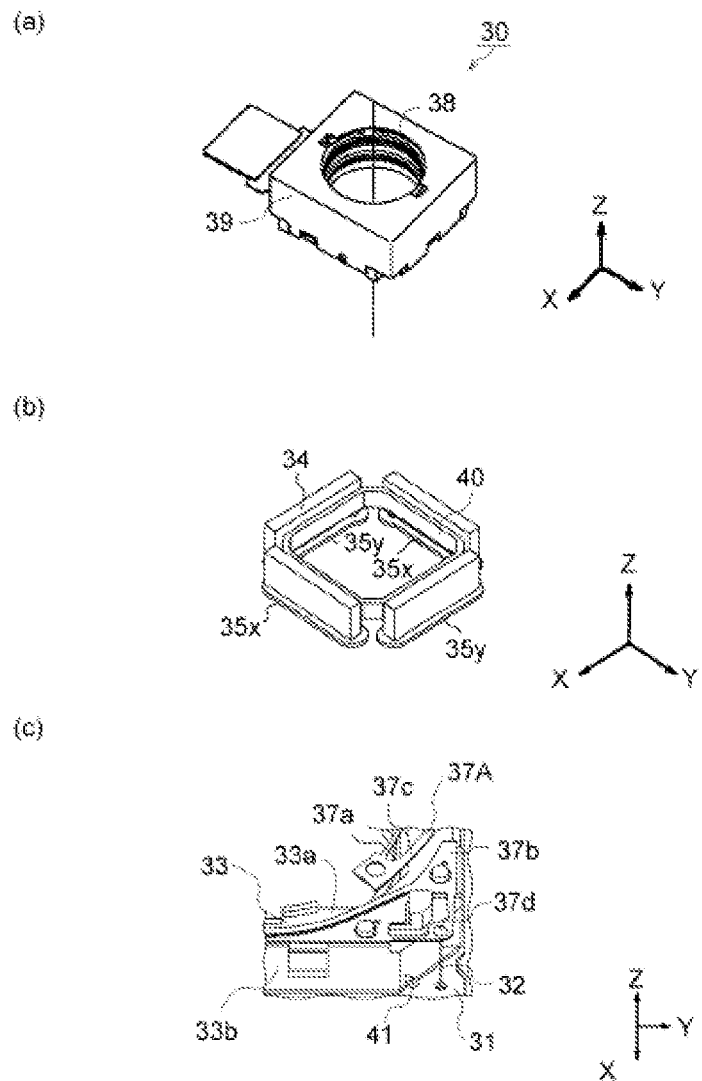
FIG. 6 shows a perspective view of the shake correction device of the prior art.
Figure 7:
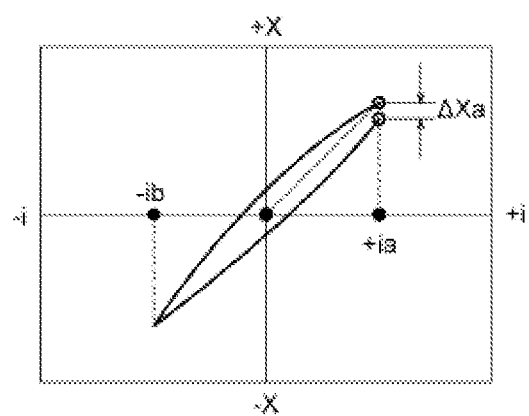
FIG. 7 shows a picture of hysteresis phenomenon caused by the damping material of the shake correction device of the prior art.

As shown in FIG. 5 (b), the brake member 16S is a member of box shape which is formed by a non-magnetic conductor and is opened in the −Z side, and the brake member 16S covers and surrounds the photographed object side and outer periphery side of the magnet holder 13 and the permanent magnet 14 and the like. The brake member 16S includes a rectangle board-shaped top portion 16d, a side portion 16f, an eddy current induction plate 16a of +Z side (the positive direction of the optical axis), and an eddy current induction plate 16b of the radial direction (the outer periphery side). The eddy current induction plate 16a and the eddy current induction plate 16b generate the eddy currents corresponding to the magnetic field generated by the shift of the permanent magnet.

The top portion 16d is rectangle board-shaped, and has a circular opening formed along the Z direction in the center portion of the surface facing to the optical axis direction, and further functions as an electromagnetic wave shielding board. The eddy current induction plate 16a of +Z side (the positive direction of the optical axis) is shifted towards the side surface (surface) 14a of the +Z side (the positive direction of the optical axis) of the permanent magnet 14 from the edge portion of the center portion of the each side of the top portion 16d (i.e. recessed towards the −Z direction), and is opposite to the side surface (surface) 14a of the +Z side of the permanent magnet 14. The side portion 16f extends towards the negative direction of the optical axis (−Z direction) from angle portion (outer edge portion) of the four corners on the top portion 16d, covers the area near the angle portion in the radial direction of the shake correction device 10S and functions as a electromagnetic wave shielding board. The eddy current induction plate 16b of radial direction shifts towards the board face 14b of the outer side of the permanent magnet 14 from the side of the side portion 16*f*, and is opposite to the board face 14*b* of the outside of the permanent magnet 14.

That is, the brake member 16S of the present embodiment is different from the brake member 16 of the embodiment one, the configuration of the present invention includes: a side portion 16*f* which cover the column portion 13*b* of the magnet holder 13 adjacent to the permanent magnet 14 from the outside.

Thus, if vibration or impact is applied to the shake correction device 10S to make the permanent magnet 14 shift (vibrate), the eddy currents, the amount of which corresponds to the shift speed, flows through the surface of the braking member 16S (the eddy current induction plate 16*a* of +Z side and the eddy current induction plate 16*b* of the radial direction) which is opposite to the permanent magnet 14 to offset the change of the magnetic field generated with the shift of the permanent magnet 14. Then permanent magnet 14 generates a magnetic field as a braking force, the intensity of magnetic field corresponds to the shift speed of permanent magnet 14. As a result, the vibration or the impact generated by the shake correction device 10 is eased to prevent the generation of the hysteresis phenomenon and the unnecessary resonance generated by the shake correction device 10 is suppressed and further the endurance with respect to the impact from the outside has also been improved. The shake correction device 10 surrounds the +Z side and the outside through the top portion 16*d*, the side portion 16*f*, the eddy current induction plate 16*a* of +Z side, and the eddy current induction plate 16*b* to shield electromagnetic waves leaked from the outside or emitted from an image sensor.

Furthermore, the back side eddy current induction plate 16*e* inserted into the winding core portion of the coil 15*x* for swinging of X side and coil 15*y* for swinging of Y side as shown in the FIG. 4 is used in the embodiment two to suppress unnecessary resonance generated by the shake correction device 10S and improve endurance with respect to impact from the outside.

The present invention is described through the above embodiments, but the scopes of the present invention are not limited within the scopes described in the embodiments. The skilled can understand that various changes or improvements can be applied to the embodiments. The changed or improved embodiments are also within the scopes of the present invention.

What is claimed is:

1. A shake correction device, comprising a plurality of rectangle board-shaped permanent magnets, when a direction toward a photographed object is set as a positive direction of an optical axis, a surface of each of the permanent magnets faces a lens and the permanent magnets are disposed around the optical axis at an interval of 90 degrees, and the permanent magnets and the lens are swung along a direction perpendicular to the optical axis, wherein the shake correction device further includes:

a brake member, formed by a non-magnetic conductor, and at least one eddy current induction plate arranged on the brake member, wherein, the at least one eddy current induction plate is arranged to be opposite to and has a gap with a surface on an outer periphery side of the permanent magnets, a surface on the positive direction of the optical axis, and a surface adjacent to the surface on the outer periphery side and the surface on the positive direction of the optical axis, and the at least one eddy current induction plate generates eddy currents in response to a magnetic field caused by the shift of the permanent magnets.

2. A shake correction device, comprising a plurality of rectangle board-shaped permanent magnets, when a direction toward the photographed object is set as a positive direction of an optical axis, a surface of each of the permanent magnets faces a lens and the permanent magnets are disposed around the optical axis at an interval of 90 degrees, and the permanent magnets and the lens are swung along a direction perpendicular to the optical axis, wherein the shake correction device further includes:

a brake member, formed by a non-magnetic conductor, at least one eddy current induction plate and at least one electromagnetic shield board arranged on the brake member, wherein, the at least one eddy current induction plate is arranged to be opposite to and has a gap with a surface on an outer periphery side of the permanent magnets and a surface on the positive direction of the optical axis, and eddy currents are generated by the at least one eddy current induction plate in response to a magnetic field caused by the shift of the permanent magnets;

the at least one electromagnetic shield board has a rectangle board-shaped top portion and a side portion, and covers the positive direction of the optical axis and the outer periphery side of the permanent magnets, wherein, an opening is formed in a center portion of a surface facing to the optical axis of a top portion and is arranged on the positive direction of the optical axis direction of the permanent magnets, the side portion extends towards the negative direction of the optical axis direction from an edge portion of the top portion and is arranged beside the side surface of the permanent magnets.

3. The shake correction device as in claim 1, wherein the brake member includes an eddy current induction plate arranged on a core portion of a coil for swinging, and is opposite to and has a gap with a surface at a negative direction of the optical axis of the permanent magnet, wherein the coil for swinging is arranged closer to the negative direction of the optical axis than the permanent magnet.

4. The shake correction device as in claim 2, wherein the brake member includes an eddy current induction plate arranged on a core portion of a coil for swinging, and is opposite to and has a gap with a surface at a negative direction of the optical axis of the permanent magnet, wherein the coil for swinging is arranged closer to the negative direction of the optical axis than the permanent magnet.

\* \* \* \* \*